United States Patent [19]

Honda et al.

[11] Patent Number: 4,791,021

[45] Date of Patent: Dec. 13, 1988

[54] MAGNETIC RECORDING MEDIUM

[75] Inventors: Kunihiko Honda; Toshihiko Miura; Hiroaki Araki, all of Kanagawa, Japan

[73] Assignee: Fuji Photo Film Co., Ltd., Kanagawa, Japan

[21] Appl. No.: 106,683

[22] Filed: Oct. 13, 1987

[30] Foreign Application Priority Data

Oct. 13, 1986 [JP] Japan ............................... 61-241499
Oct. 13, 1986 [JP] Japan ............................... 61-241500

[51] Int. Cl.$^4$ .............................................. G11B 5/712
[52] U.S. Cl. ................................ 428/329; 252/62.54; 427/128; 427/131; 428/328; 428/403; 428/425.9; 428/522; 428/694; 428/900
[58] Field of Search .............. 428/694, 695, 328, 329, 428/704, 522, 425.9, 403; 252/62.54; 360/134–136; 427/128–131

[56] References Cited

U.S. PATENT DOCUMENTS

| | | | |
|---|---|---|---|
| 4,137,361 | 1/1979 | Deffeyes | 428/403 |
| 4,218,507 | 8/1980 | Deffeyes | 428/403 |
| 4,361,627 | 11/1982 | Ohata | 428/521 |
| 4,368,239 | 1/1983 | Nakajima | 428/409 |
| 4,521,486 | 6/1985 | Ninomiya | 428/695 |
| 4,619,861 | 10/1986 | Nakayama | 428/339 |

FOREIGN PATENT DOCUMENTS 144037 8/1984 Japan.
221325 11/1985 Japan.

Primary Examiner—Ellis P. Robinson
Attorney, Agent, or Firm—Sughrue, Mion, Zinn, Macpeak, and Seas

[57] ABSTRACT

A magnetic recording medium is described, having improved carrier noise ratio and weather resistance, by controlling the content and the crystal size of iron nitride which contains iron oxide or $\epsilon\text{-Fe}_x\text{N}$ ($2 < x \leq 3$).

8 Claims, No Drawings

MAGNETIC RECORDING MEDIUM

FIELD OF THE INVENTION

The present invention relates to a magnetic recording medium having a magnetic layer which contains iron nitride type ferromagnetic particles, and more particularly it relates to a magnetic recording medium having improved carrier noise ratio (referred to as C/N hereinafter) and weather resistance.

BACKGROUND OF THE INVENTION $\gamma$-Fe$_2$O$_3$, Fe$_3$O$_4$, their intermediate oxides (such iron oxide type ferromagnetic particles are referred to as "FeO$_x$ ($4/3 \leq x \leq 3/2$)" herein), Co-containing chromium dioxide and ferromagnetic alloy particles have been mainly used as ferromagnetic particles for magnetic recording media.

Recently, iron nitride type magnetic layer has been studied and suggested for use as a magnetic layer of a magnetic recording medium. Examples thereof include $\alpha''$-Fe$_{16}$N$_2$, $\gamma'$-Fe$_4$N (referred to as "Fe$_4$N" hereinafter), $\epsilon$-Fe$_x$N ($2 < x \leq 3$) (referred to as "Fe$_{2-3}$N" hereinafter) and Fe$_4$N is very suitable in terms of initial magnetic properties as a magnetic material for a magnetic recording medium. Many approaches have been made to use such iron nitride in a magnetic recording medium. However, its weather resistance is poor and its magnetic characteristics greatly deteriorate with the passage of time, and thus it has been difficult to put it into practical use.

In order to avoid the above defects, it has been suggested in Japanese patent application (OPI) No. 76105/85 (the term "OPI" used herein means a published unexamined patent application) that surfaces of iron nitride particles be coated with oxides such as iron oxide. Further, it is also suggested in Japanese patent application (OPI) No. 59304/82 that iron nitride (Fe$_4$N) be used in an amount of from 10 to 70% based on iron metal particles mainly comprised of iron in a magnetic recording medium.

However, even though surfaces of iron nitride particles are simply coated with oxides in accordance with the above, the dispersibility of the particles is insufficient, and C/N and weather resistance of the thus obtained magnetic recording medium are also insufficient.

SUMMARY OF THE INVENTION

An object of the present invention is to provide a magnetic recording medium using iron nitride type magnetic particles as ferromagnetic particles, and having improved carrier noise ratio C/N and weather resistance.

As a result of extensive research, it has now been found that a magnetic recording medium having good dispersibility of iron nitride particles and simultaneously improved C/N and weather resistance can be obtained by controlling the content and the crystal size of predetermined iron oxide, or the content and the crystal size of predetermined Fe$_{2-3}$N in Fe$_4$N of iron nitride.

That is, the present invention is directed to a magnetic recording medium comprising a non-magnetic support having provided thereon a magnetic layer containing ferromagnetic particles and a binder, wherein said ferromagnetic particles comprise iron nitride-containing iron oxide particles in which the content of iron oxide (FeO$_x$, $4/3 \leq x \leq 3/2$) is from 0.5 to 10% (integral intensity ratio of X-ray diffraction peak) based on iron nitride (Fe$_4$N) and said iron nitride-containing iron oxide particles have a crytal size of from 150 to 250 Å. Further, the present invention is directed to a magnetic recording medium comprising a non-magnetic support having provided thereon a magnetic layer containing ferromagnetic particles and binders, wherein said ferromagnetic particles are mainly comprised of ferromagnetic iron nitride particles, the content of Fe$_{2-3}$N in said ferromagnetic iron nitride particles is from 0.01 to 3.0% (shown in terms of integral intensity raito of X-ray diffraction peak) based on Fe$_4$N and the crystal size of the ferromagnetic iron nitride particles is from 150 to 250 Å.

DETAILED DESCRIPTION OF THE INVENTION

Fe$_4$N, Fe$_{2-3}$N, and $\zeta$-Fe$_2$N are known as stable phases iron nitride at room temperature. Among those, Fe$_4$N has a highest magnetic moment, a Tc of 488° C. and is therefore suitable as ferromagnetic particles. Iron nitride particles used for a magnetic recording medium are generally prepared by nitriding metal particles with ammonium, and the thus obtained iron nitride is Fe$_4$N or mainly comprised of Fe$_4$N. That is, the above Fe$_{2-3}$N and the like are not so suitable as ferromagnetic particles of a magnetic recording medium and iron nitride is generally prepared under the condition that Fe$_{2-3}$N should not be prepared.

By controlling the manufacturing conditions of iron nitride particles so that Fe$_{2-3}$N is formed in an amount of only from 0.01 to 3.0% (shown in terms of integral intensity ratio of X-ray diffraction peak) and that the crystal size of Fe$_{2-3}$N is from 150 to 250 Å and by using such iron nitride particles in a magnetic recording medium, the inventors of the present invention found that iron nitride particles having excellent dispersibility and C/N can further be improved by using iron oxide containing iron nitride particles and binders having a polar group in combination.

Iron oxide containing iron nitride particles, which are contained in the magnetic recording medium referred to above wherein iron oxide is contained in ferromagnetic particles in an amount of 0.5 to 10%, based on Fe$_4$N, is prepared in the following manner. Particles of iron metals or alloys mainly comprised of iron, both of which are referred to as iron metals hereinafter, are nitrided in an atmosphere of NH$_3$+H$_2$ at about 300° to 500° C. to prepare iron nitride mainly comprised of $\gamma'$-Fe$_4$N, which is gradually surface oxidized at from room temperature to 50° C. under air or oxygen for from several hours to a few score hours.

Iron oxide FeO$_x$ ($4/3 \leq x \leq 3/2$) is formed on the surface of iron nitride particles by the above gradual oxidation. That is, $\gamma$-Fe$_2$O$_3$, Fe$_3$O$_4$ and the intermediate oxides are formed. In this case, gradual oxidation is conducted so that content of iron oxide is 0.5 to 10%, particularly 2.0 to 5.0% (shown in terms of integral intensity ratio of X-ray diffraction peak) based on Fe$_4$N. That can be done by, for example, selecting conditions such as kinds of the oxidative atmosphere at oxidation, temperatures or the period of term. Examples of such conditions include: the oxidative atmosphere of the mixture of oxygen and an inert gas in which the inert gas content is 95% or more at the beginning of the oxidation, the oxygen content increases with the progress of the oxidation, and the oxygen content finally reaches to that of the air at the end of the oxidation; the temperature of from room temperature to 50° C., preferably from 30° to 40° C.; and the period of time of from 1 to 15 hours, preferably from 2 to 5 hours.

Iron nitride particles used a magnetic recording medium of the present invention wherein the content of $Fe_{2-3}N$ in iron nitride particles is from 0.01 to 3.0% based on $Fe_4N$ are prepared by nitriding iron metal particles in an atmosphere of $NH_3+H_2$ at from about 300° C. to 500° C. and thus iron oxide particles mainly comprised of $\gamma'-Fe_4N$ and $Fe_{2-3}N$ in an amount of from 0.01 to 3.0% are obtained. In this case, conditions for nitridation such as a gas concentration, temperatures of nitridation and the processing time are selected so that $Fe_{2-3}N$ can be obtained in such above described amount. As $NH_3$ gas concentration and processing temperatures become higher, and as processing time becomes longer, the produced amount of $Fe_{2-3}N$ becomes higher. Therefore, the above conditions are selected so that $Fe_{2-3}N$ is prepared in an amount of 0.01 to 3.0% based on $Fe_4N$. Examples of such conditions include: an $NH_3$ gas concentration of from 20 to 95%, preferably from 60 to 90%, based on the total amount of the $NH_3$ gas and $H_2$ gas; the temperature of from 300° to 600° C., preferably from 350° to 450° C.; and the processing time of from 1 to 10 hours, preferably from 2 to 5 hours.

The ratio of $Fe_{2-3}N$ can be obtained from the strength ratio calculated by integration based on X ray diffractiometry on the sampled iron nitride particles.

The integral intensity ratio of X-ray diffraction peak usesd herein corresponds to the weight ratio of the components.

The iron metals used in the above methods are prepared by the following methods.

(1) Reducing iron oxyhydrooxide ($\alpha$-FeOOH) or iron oxide in an air phase.

(2) Heating and decomposing organic acid salts of ferromagnetic metals and reducing them in a reducing gas.

(3) Heating and decomposing metal (iron) carbonyl compounds.

(4) Evaporating ferromagnetic metals in an inert gas under low pressure.

(5) Reducing metal (iron) salts capable of forming ferromagnetic particles in an aqueous solution by using reducing substances such as hydrated boron compounds, hypophosphite, or hydrizine.

Among these methods, the method (1) is the most preferred in view of characteristics of the thus obtained iron metal and cost of manufacturing the same.

Acicular iron metal particles can be obtained in accordance with the above methods. In this instance, iron metal particles which are capable of providing iron oxide containing iron nitride particles having a crystal size (crystal size measured by X-ray analysis) of from 150 to 250 Å, preferably from 150 to 200 Å after nitridation and gradual oxidation can be prepared by optimizing the manufacturing conditions.

Iron oxide containing iron nitride particles used in the present invention are obtained by preparing the iron metal particles, which is then nitrided and gradually oxidized. Iron alloy particles can also be used as iron metals. That is, salts of metals such as Ni, Co, Al, Si, P, S, Ti, Cu, Mn, Cu, Zn or the like are made co-existent in the reaction system for preparing iron metal particles, particles of those metals and iron alloy are obtained, and the particles are then nitrided and gradually oxidized to prepare iron oxide containing iron nitride particles.

In the present invention, the above described iron oxide containing iron nitride particles can be used with other ferromagnetic particles such as $\gamma-Fe_2O_3$, $Fe_3O_4$, Co-modified $\gamma-Fe_2O_3$, ferromagnetic metal (alloy) particles or Ba-ferrite. In this instance, iron oxide-containing iron nitride particle should comprises 50 wt% or more of the ferromagnetic particles.

As described above, iron oxide containing iron nitride particles having a crystal size of from 150 to 250 Å and containing iron oxide in an amount of from 0.5 to 10% based on $Fe_4N$ have good dispersibility for a binder, and by using such magnetic particles, a magnetic recording medium having improved C/N and weather resistance can be obtained.

In the present invention, it is preferred that binders containing a polar group as described hereinafter are used, and generally used following binders can also be used.

The binders used for preparing a magnetic layer of the present invention are generally used thermoplastic resins, thermosetting resins, or reactive type resins. These resins can be used alone or in combinations.

The thermoplastic resins are those having an average molecular weight of from 10,000 to 200,000 and a degree of polymerization of from about 200 to 2000. The examples of such resins are vinyl chloride and vinyl acetate copolymer resin, vinyl chloride and vinylidene chloride copolymer, an acryl resin, cellulose derivatives, various synthetic rubber type thermoplastic resin, urethane elastomer, polyvinyl fluoride, polyamide resins, polyvinyl butyrate, styrene and butadiene copolymer and polystyrene resins. Those can be used alone or in combination.

The thermosetting resins or reactive type resins are those resins having an average molecular weight of 200,000 or less in a state of coating solution, and having a substantially infinite molecular weight due to condensation reaction or adduct reaction after coating. It is preferred that the thermosetting resins do not soften nor melt by heat treatment until those are hardened. Examples of such resins include phenol and formalin-novolac resins, phenol and formalin-resol resins, phenol and furfural resins, xylene and formaldehyde resins, urea resins, melamine resins, dry oil modified alkyd resins, phenol resin modified alkyd resins, maleic acid resin modified alkyd resins, unsaturated polyester resins, a combination of epoxy resins and hardening agents, polyether moisture hardenable resins having an isocyanate group at the terminal, polyisocyanate prepolymer, and a combination of polyisocyanate prepolymer and resins having an active hydrogen. Those resins can be used alone or in combination.

Those binders are generally used in an amount of from 10 to 100 parts by weight, and preferably from 15 to 50 parts by weight, per 100 parts by weight of ferromagnetic particles.

In addition to the above resins, it is preferred that binders having a polar group, particularly those binders comprised of vinyl chloride type polymer having a sulfonic acid groups ($-SO_3M$) and polyurethane resins having sulfonic acid groups ($-SO_3M$) are used as binders in the present invention. Particularly in this instance, dispersibility of the above described iron oxide containing iron nitride particles is remarkably improved, and C/N as well as weather resistance can be improved.

The preferred polar group containing binders include vinyl chloride type copolymer having $-SO_3M^1$ group, $-COOM^1$ group, $-OSO_3M^1$ group, or

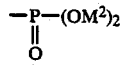

(in these formulae, $M^1$ is hydrogen or an alkali metal, and $M^2$ is hydrogen, an alkali metal, or hydrocarbon group) in a molecule, polyester resins having —$SO_3M^1$ group in a molecule and polyurethane resins having —$SO_3M^1$ in a molecule.

The vinyl chloride type copolymer having a polar group is prepared by using, for example, vinyl chloride, vinyl acetate and vinyl alcohol copolymer, vinyl chloride, vinyl propionate and vinyl alcohol copolymer and vinyl chloride, vinyl acetate, vinyl propionate and vinyl alcohol copolymer as a starting material and reacting a hydroxyl group of vinyl alcohol with $ClCH_2CH_2OSO_3M^1$, $ClCH_2CH_2OSO_3M^1$, $ClCH_2COOM^1$ and

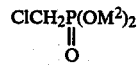

(the definition of $M^1$ and $M^2$ are the same as above).

The polyester resins or the polyurethane resins having a polar group in the present invention can be obtained by introducing —$SO_3M^1$ group to polyurethane resins or polyester resins.

The above described binders having a polar group are disclosed in detail in Japanese patent application (OPI) No. 8127/84.

It is particularly preferred that the vinyl chloride type copolymer having a polar group and the polyurethane resin having a polar group are used as binders, and in this case, better results can be obtained in the present invention.

The binders having a polar group are used in an amount of from 7 to 20 parts by weight per 100 parts by weight of ferromagnetic particles.

In addition to the above, additives that are commonly used for a magnetic recording medium such as antistatic agents (e.g., carbon black), lubricating agents or abrasive agents can be used, if necessary.

The magnetic layer of the present invention is formed by mixing and kneading the above described ferromagnetic particles, binders, and, if necessary, additives in an appropriate organic solvent, and coating the resulting magnetic coating solution on a support.

The organic solvents used for dispersing and coating the magnetic coating solution include ketones such as acetone, methyl ethyl ketone, methyl isobutyl ketone or cyclohexanone; esters such as methyl acetate, ethyl acetate, butyl acetate, ethyl lactate or monoethyl ether of glycol acetate; ethers such as ethyl ether, glycol dimethyl ether, glycol monoethyl ether, dioxane or tetrahydrofuran; aromatic hydrocarbons such as benzene, toluene or xylene; and chlorinated hydrocarbons such as methylene chloride, ethylene chloride, carbon tetrachloride, chloroform, ethylene chlorohydrin or dichlorobenzene.

The materials for a support to be coated with a magnetic coating solution include polyesters such as polyethylene terephthalate or polyethylene 2,6-naphthalate; polyolefins such as polyethylene or polypropylene; cellulose derivatives such as cellulose triacetate; plastics such as polycarbonate, polyimide or polyamideimide; non-magnetic metals such as aluminum, copper, tin, zinc or non-magnetic alloys including the same; and plastics vapor deposited with metals such as aluminum.

The shape of non-magnetic support can be a film, a tape, a sheet, a disk, a card, or a drum. Materials for a support are optimally selected depending upon the particular shape.

After a magnetic layer is provided, it is subjected to orientation, dried, and if necessary subjected to surface treatment, and thus a magnetic recording medium is obtained.

The present invention is illustrated in more detail by the following Examples, but should not be limited thereto. In the following, all parts are by weight.

EXAMPLE 1

The following magnetic coating solution was prepared using iron oxide containing iron nitride magnetic particles with various contents of iron oxide and various crystal sizes.

| Composition of Magnetic coating solution | |
|---|---|
| Iron oxide containing iron nitride magnetic particles | 100 parts |
| Copolymer of vinyl chloride and vinyl acetate containing sulfonic acid ("MR-110", trademark for product manufactured by Nippon Zeon Co., Ltd.) | 8.2 parts |
| Polyurethane containing sulfonic acid ("UR-8300", trademark for product manufactured by Toyobo Co., Ltd.) | 5.2 parts |
| Abrasive agent ($Al_2O_3$) | 10.0 parts |
| Methyl ethyl ketone | 190.0 parts |
| Cyclohexanone | 126.0 parts |

The above iron oxide-containing iron nitride particles were prepared as follows adjusting the conditions so that various contents of $FeO_x$ (based on $Fe_4N$) and various crystal sizes were provided.

The iron nitride particles were obtained by reducing acicular $\alpha$-FeOOH with hydrogen and heating the resulting acicular Fe particles at an atmosphere of mixed gas of $NH_3$ and $H_2$ at 400° C. for 2 hours.

Regarding a particle size, acicular Fe particles having an average particle length of from 0.1 to 0.3 $\mu$m and having an axis ratio of from 8 to 10 were selected and iron nitride having various sizes was obtained.

Iron nitride thus obtained in accordance with the above method was soaked in toluene, taken out therefrom and was gradually oxidized using oxygen containing gas at room temperature to obtain iron nitride particles having various $FeO_x$ content by adjusting the treating period of from 2 to 5 hours.

The above described composition of magnetic coating solution was mixed with glass beads by a dispersing device for 4 hours and was filtered with a 1 $\mu$m filter. Then, the following additives were added thereto while stirring, and the resulting liquid dispersion was coated on a polyester film having 13 $\mu$m thickness in a thickness of 3.5 $\mu$m. The magnetic layer was subjected to magnetic orientation, dried, was given a supercalendering treatment and was slit to a ½ inch width to obtain each sample.

| Additives: | |
|---|---|
| Polyisocyanate ("Collonate L#3041", a trade name, manufactured by Nippon Polyurethane Co., Ltd.) | 8.2 parts |

| Additives: | |
|---|---|
| Lubricating agent-I (Stearic acid) | 0.5 part |
| Lubricating agent-II (Butyl stearate) | 1.5 parts |
| Lubricating agent-III (Oleic acid) | 0.5 part |

With each sample, carrier noise ratio (C/N) and demagnetization (60° C., 90%RH, seven days) were measured.

The results are shown in Table 1.

TABLE 1

| Sample No. | FeOx content* (for Fe4N) (%) | Crystal size of magnetic particles (Å) | C/N (dB) | Demagnetization(60° C., 90% RH 7 days) (%) | Note |
|---|---|---|---|---|---|
| 1 | 0.3 | 180 | 3.0 | −35 | Comparative Example |
| 2 | 0.5 | 180 | 3.0 | −15 | Example |
| 3 | 2.0 | 180 | 2.8 | −10 | Example |
| 4 | 5.0 | 180 | 2.4 | −7 | Example |
| 5 | 10.0 | 180 | 2.0 | −4 | Example |
| 6 | 15.0 | 180 | 1.5 | −2 | Comparative Example |
| 7 | 2.0 | 130 | 1.7 | −9 | Comparative Example |
| 8 | 2.0 | 150 | 2.5 | −10 | Example |
| 9 | 2.0 | 200 | 2.3 | −10 | Example |
| 10 | 2.0 | 250 | 2.0 | −9 | Example |
| 11 | 2.0 | 300 | 0.5 | −9 | Comparative Example |

Remarks:
C/N 2 dB or more is necessary to ensure high image quality.
Demagnetization should be within −15%, and preferably within −10%.
*Strength ratios calculated with integration based on X-ray diffractiometry.

C/N and demagnetization were evaluated in the following manner. C/N: It is shown in terms of relative values when C/N of a video tape "Super SXG", trademark for product manufactured by Fuji Photo Film Co., Ltd. was assumed to be 0 dB.
Demagnetization: (Decrease of magnetic flux density (13 m))

The difference of saturated densities before and after each sample was allowed to stand for 7 days at 60° C. and 90% RH.

As is clear from the results of Table 1, both C/N and demagnetization (weather resistance) of a magnetic recording medium using iron oxide-containing iron nitride particles having $FeO_x$ contents and crystal sizes as defined in the present invention (Sample Nos. 2-5, 8-10) are more excellent than those of a magnetic recording medium using iron nitride particles having contents and sizes in the outside ranges.

EXAMPLE 2

Using iron nitride magnetic particles having various $Fe_{2-3}N$ contents (for $Fe_4N$) and various crystal sizes, the magnetic coating solution having the following composition was prepared.

| Composition of Magnetic coating solution | |
|---|---|
| Iron nitride magnetic particles | 100 parts |
| Copolymer of vinyl chloride and vinyl acetate containing sulfonic acid ("MR-110", trademark for product manufactured by Nippon Zeon Co., Ltd.) | 8.2 parts |
| Polyurethane containing sulfonic acid ("UR-8300", trademark for product manufactured by TOYOBO Co., Ltd.) | 5.2 parts |
| Abrasive agent ($Al_2O_3$) | 10.0 parts |
| Methyl ethyl ketone | 190.0 parts |
| Cuclohexanone | 126.0 parts |

The above iron nitride particles were prepared as follows adjusting the manufacturing conditions so that various contents of $Fe_{2-3}N$ (for $Fe_4N$) and various crystal sizes were provided.

The iron nitride particles were obtained by reducing acicular α-FeOOH with hydrogen and heating the thus obtained acicular Fe particles at an atmosphere of mixed gas of $NH_3$ and $H_2$ at 400° C. for 2 hours.

Various contents of $Fe_{2-3}N$ were obtained by controlling the mixing ratio of $NH_3/H_2$ as (5/5) to (9/1).

The acicular Fe particles having an average particle length of from 0.1 to 0.3 μm and having an axis ratio of from 8 to 10 were selected to obtain iron nitride having various sizes.

The thus obtained iron nitride was soaked in toluene, separated therefrom, and then was gradually oxidized with oxygen containing gas at room temperature for 3 hours.

The above composition of the magnetic coating solution was mixed with glass beads by a dispersing device for 4 hours and was filtered with a 1 μm filter, and further, the following additives were added thereto with stirring and the solution was coated in a thickness of 3.5 μm on a polyester film having a 13 μm thickness. The magnetic layer was subjected to magnetic orientation, dried and surface treated by calendering and slit to a ½ inch width to obtain each sample.

| Additives: | |
|---|---|
| Polyisocyanate ("Collonate L#3041", trademark for product manufactured by Nippon Polyurethane Co., Ltd.) | 8.2 parts |
| Lubricating agent-I (Stearic acid) | 0.5 part |
| Lubricating agent-II (Butyl stearate) | 1.5 parts |
| Lubricating agent-III (Oleic acid) | 0.5 part |

Regarding each sample, C/N and gloss (gloss means degree of surface smoothness and dispersibility) were measured.

The results are shown in Table 2.

TABLE 2

| Sample No. | $Fe_{2-3}N$ content based on $Fe_4N$ (%) | Crystal size of magnetic particle (Å) | Gloss | C/N based on SXG (dB) | Note |
|---|---|---|---|---|---|
| 12 | 0 | 180 | 220 | 1.8 | Comparative Example |
| 13 | 0.01 | " | 245 | 2.0 | Example |
| 14 | 0.2 | " | 253 | 2.8 | Example |
| 15 | 1.0 | " | 250 | 2.5 | Example |
| 16 | 3.0 | " | 242 | 2.2 | Example |
| 17 | 5.0 | " | 225 | 1.8 | Comparative Example |
| 18 | 0.2 | 130 | 270 | 1.7 | Comparative Example |
| 19 | " | 150 | 260 | 2.5 | Example |
| 20 | " | 200 | 242 | 2.3 | Example |
| 21 | " | 250 | 220 | 2.0 | Example |
| 22 | " | 300 | 200 | 0.5 | Comparative |

TABLE 2-continued

| Sample No. | $Fe_{2\sim3}N$ content based on $Fe_4N$ (%) | Crystal size of magnetic particle (Å) | Gloss | C/N based on SXG (dB) | Note |
|---|---|---|---|---|---|
| | | | | | Example |

Gloss was measured in accordance with JIS-Z8741 under the condition that a surface of a glass having refractive index of 1.567 at an angle of incidence 45° has gloss of 100%.

C/N was measured in the same manner as in Example 1.

It is apparent from the results in Table 2 that both gloss and C/N are excellent when the content of $Fe_{2-3}N$ and the crystal size are within the range as defined in the present invention.

While the invention has been described in detail and with reference to specific examples thereof, it will be apparent to one skilled in the art that various changes and modifications can be made therein without departing from the spirit and scope thereof.

We claim:

1. A magnetic recording medium comprising a nonmagnetic support having provided thereon a magnetic layer containing ferromagnetic particles and a binder, wherein said ferromagnetic particles comprise iron nitride particles comprising iron oxide on the surface thereof in which the content of iron oxide($FeO_x$, $4/3 \leq x \leq 3/2$) is from 0.5 to 10% (integral intensity ratio of X-ray diffraction peak) based on iron nitride ($Fe_4N$) and said iron nitride-containing iron oxide particles have a crystal size of from 150 to 250 Å and are mainly comprised of $\gamma'$—$Fe_3N_4$.

2. A magnetic recording medium as claimed in claim 1, wherein said binder includes polar groups.

3. A magnetic recording medium as claimed in claim 2, wherein said binder including polar groups are a vinyl chloride type copolymer containing sulfonic acid groups and a polyurethane resin containing sulfonic acid groups.

4. A magnetic recording medium as claimed in claim 2, wherein binders are contained in an amount of from 7 to 20 parts by weight per 100 parts by weight of said iron nitride particles containing iron oxide.

5. A magnetic recording medium comprising a nonmagnetic support having provided thereon a magnetic layer containing ferromagnetic particles and a binder, wherein said ferromagnetic particles mainly comprising ferromagnetic iron nitride particles containing $Fe_{2-3}N$ in an amount of from 0.01 to 3.0% (integral intensity ratio of X-ray diffraction peak) based on $Fe_4N$ and having a crystal size of from 150 to 250 Å.

6. A magnetic recording medium as claimed in claim 5, wherein said binders contain polar groups.

7. A magnetic recording medium as claimed in claim 6, wherein said binder comprises vinyl chloride type copolymer containing sulfonic acid groups and a polyurethane resin containing sulfonic acid groups.

8. A magnetic recording medium as claimed in claim 6, wherein binders are contained in an amount of from 7 to 20 parts by weight per 100 parts by weight of iron nitride particles.

* * * * *